(No Model.) 2 Sheets—Sheet 1.
T. A. LONG, S. P. FILLEY & F. N. RUGGLES.
HORSE COVER SUPPORT.
No. 373,779. Patented Nov. 22, 1887.
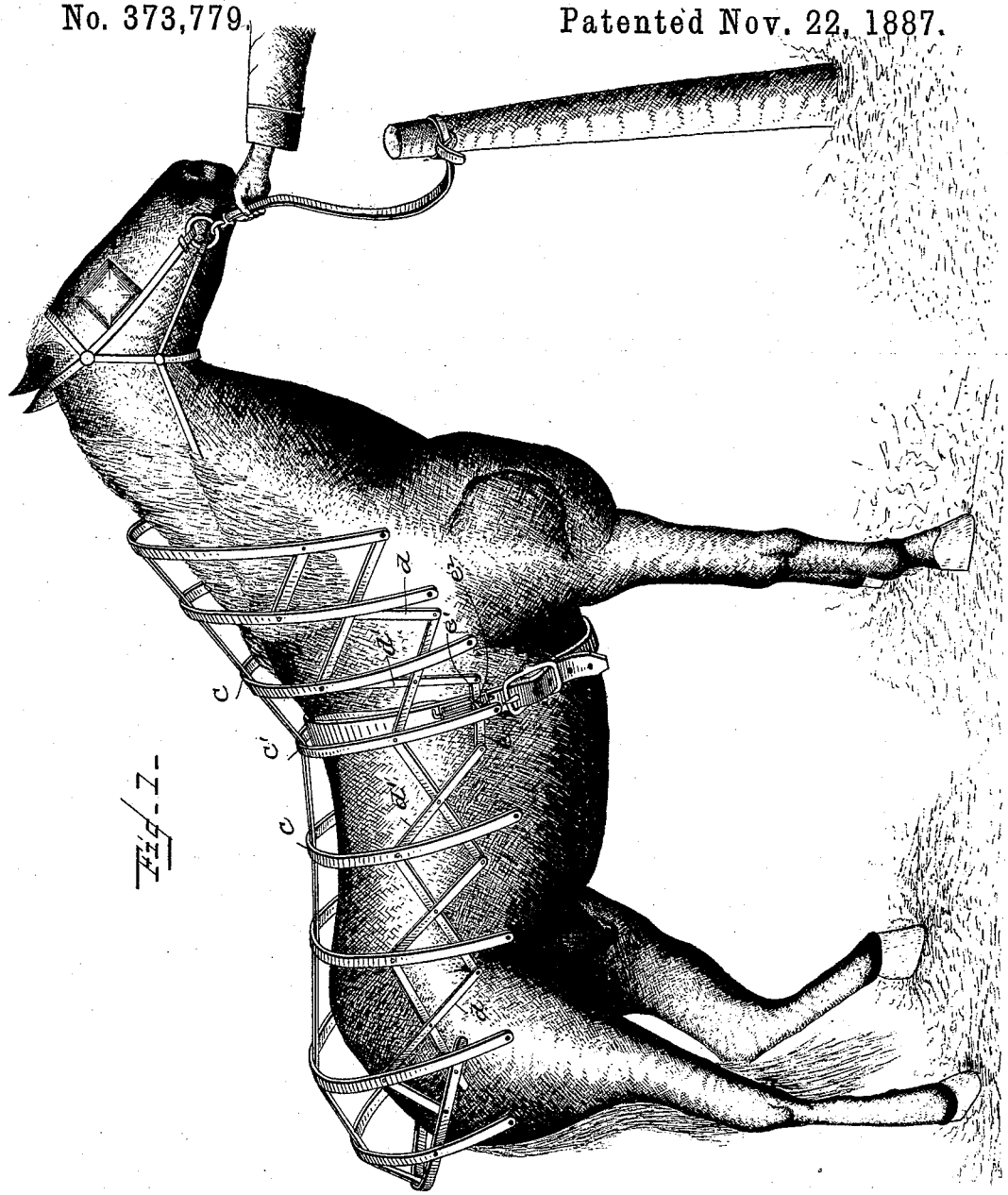

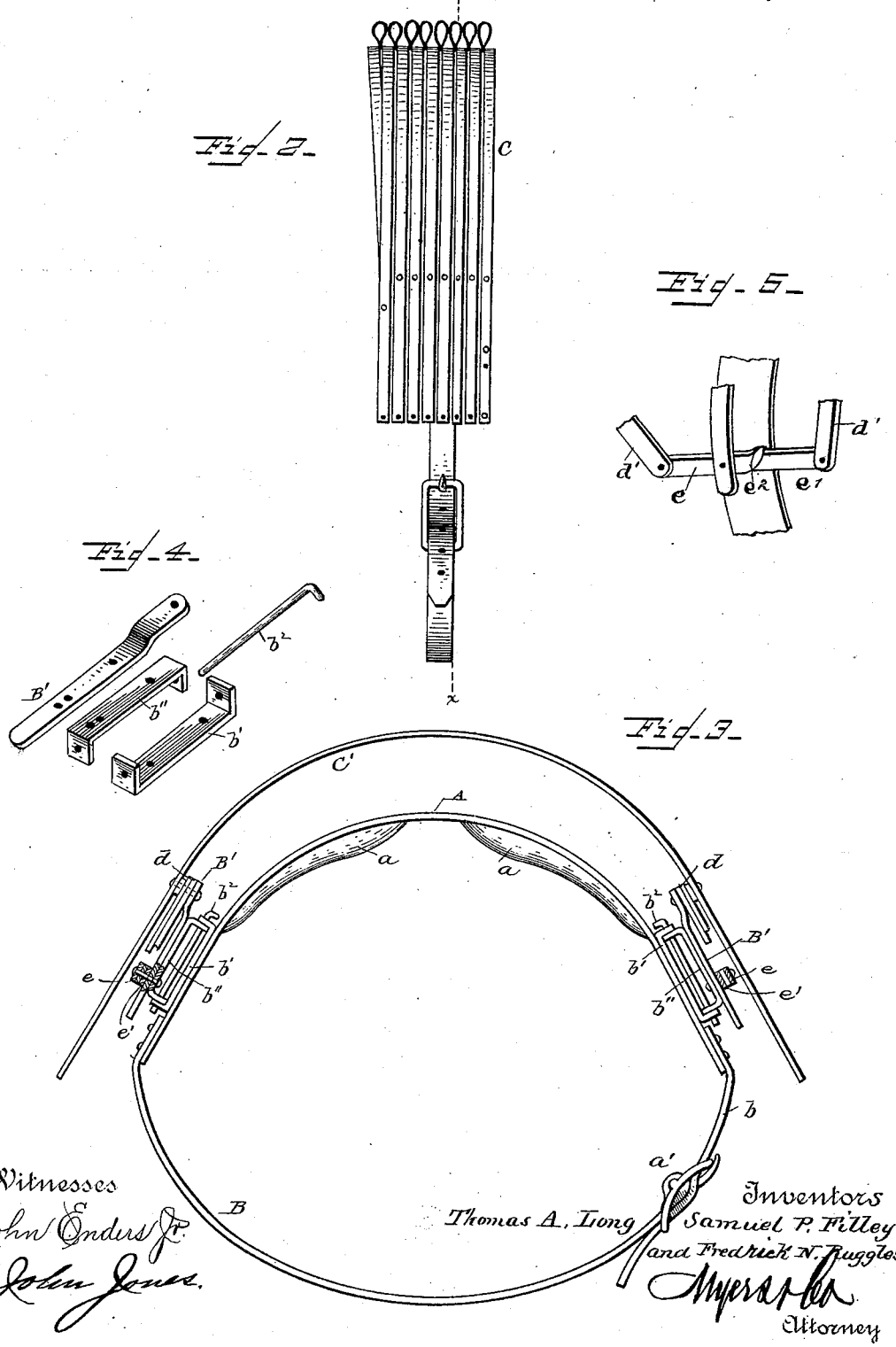

United States Patent Office.

THOMAS A. LONG, OF SWEET VALLEY, SAMUEL P. FILLEY, OF PITTSTON, AND FREDRICK N. RUGGLES, OF LEHMAN, PENNSYLVANIA; SAID LONG AND FILLEY ASSIGNORS OF ONE-SIXTH OF THEIR RIGHT TO SAID RUGGLES.

HORSE-COVER SUPPORT.

SPECIFICATION forming part of Letters Patent No. 373,779, dated November 22, 1887.

Application filed August 4, 1887. Serial No. 246,143. (No model.)

*To all whom it may concern:*

Be it known that we, THOMAS A. LONG, SAMUEL P. FILLEY, and FREDRICK N. RUGGLES, citizens of the United States of America, residing at Sweet Valley, Pittston, and Lehman, in the order named, in the county of Luzerne and State of Pennsylvania, have invented certain new and useful Improvements in Horse Covers or Umbrellas, of which the following is a specification, reference being had therein to the accompanying drawings.

This invention pertains to certain new and useful improvements in horse covers or umbrellas, the same being designed to be secured directly to the back of the horse and capable of being closed when not in use, and also of being readily opened or extended when it is desired to support a cover thereon; and the invention consists in the detailed construction, combination, and arrangement of the parts, substantially as hereinafter fully set forth, and particularly pointed out in the claims.

In the accompanying drawings, Figure 1 is a view in perspective, showing our improved horse cover or umbrella as applied to a horse. Fig. 2 is a view showing the same closed. Fig. 3 is a sectional view thereof on the line $x$ $x$, Fig. 2. Fig. 4 is a series of detached perspective views, and Fig. 5 is an enlarged detail view.

Referring to the drawings, A represents a curved metallic back arch or strap, to the under surface of which are secured two pads, $a$ $a$, of any preferred material, preferably leather, designed to conform to the curvature of the back of the horse to which applied.

B is a belly band or strap secured at one end to one end of the back arch or strap A and provided at its other free end with an ordinary buckle, $a'$, as shown. To the other end of the back arch or strap A is secured one end of an apertured strap, $b$, designed to engage with the buckle $a'$ of the belly-band B, whereby said arch or strap can be securely held on the horse's back, as shown in Fig. 1.

To the back arch or plate A, near each end thereof, on its outer surface, are secured U-shaped plates or brackets $b'$ $b'$, between the projecting flanges or ends of each of which are secured the flanged ends of a second U-shaped plate or bracket, $b''$, which is disposed opposite to the U-shaped plate or bracket $b'$, as shown. These outer U-shaped plates or brackets, $b''$, are secured in position by means of two headed rods or pins, $b^2$ $b^2$, extending through apertures formed in the flanged ends of the plates or brackets $b'$ $b''$, as shown.

B' B' are two corresponding similarly-formed plates rigidly secured to the outer surfaces of the second U-shaped plates or brackets, $b''$, the upper bent ends of which project a short distance beyond the upper ends of said U-shaped plates or brackets, and each of said plates B' is provided with an aperture at its upper end, as shown.

C is a series of bows or curved or arched plates connected together by cross-bars $d$, constructed after the form of "lazy-tongs," as shown in Fig. 1. These bows or curved or arched plates are designed, when opened, to conform, as far as necessary, to the general outline of the horse's back, those bows or plates toward the front being caused to have an outer inclined surface to correspond with the horse's neck, while those in the rear are slightly curved upward the desired extent, and the last two bows or plates are again curved downward, the rearmost bow being caused to nearly assume a horizontal position. One of these bows or plates C' is, together with the ends of meeting cross-bars $d$ $d$, secured to the upper ends of the plates B' by means of rivets or small bolts passed through apertures therein and through the apertures of said plates, thus effecting a connection between the arch or plate A and the series of bows or plates C C'.

To the ends of the inclined cross-bars $d'$ $d'$, secured at their upper ends to the bows or plates on either side of the bows or plates C', are pivotally connected the ends of a normally horizontal lever-arm, $e$, and a connecting-arm, $e'$, each of the former being secured at its center and each of the latter at its rear end to the plate B', as shown. This lever-arm $e$ has a projecting arm, with a bent or flanged end, $e''$, designed, when the bows or plates are opened or extended, to bear against the upper surface of the adjoining connecting-arm $e'$, as shown in Figs. 1 and 5, whereby that portion of the cover or umbrella in rear of the back-arch is prevented from having too much rearward movement, said flanged end of the lever-arm e coming in contact with said connecting-arm e' when the cover or umbrella is opened its full extent.

All of the bows or plates C, save the front and the two rear ones, are secured to the cross-bars d at their upper meeting ends, the ends of said bows or plates being extended down beyond the cross-bars comprising the lazy-tongs.

The forward bow or plate C is at each end connected to the outer free ends of two of the cross-bars d, as shown, as is also the rearmost bow or plate C, to which in turn is pivotally connected, in a manner similar to the other bows or plates, the bow or plate adjoining said rearmost one of the series. These bows or plates are connected at their centers by a thin strap, f, of leather, tape, or other suitable material.

In practice the back arch or plate A is placed on the horse to which it is designed to apply our invention, and is secured by means of the belly-band B and strap b, as shown, after which the bows or plates comprising the cover or umbrella are extended or drawn out their full length, the lazy-tong connections between the same permitting the ready accomplishment thereof. When drawn to their full extent, so as to occupy the position shown in Fig. 1, the lever-arms e and the connecting-arms e' are in horizontal positions, causing the flanged ends of said lever-arms to bear on the upper edges of the arms e', as before stated, thus preventing any further movement of the bows or lazy-tong connections. The bows or plates comprising the cover or umbrella-frame being now in the desired position, any suitable cover is placed thereon, thus protecting the animal from the heat, or in wet weather from the rain or snow, an oil-cloth cover being in this latter instance employed.

From what has been said it will be seen that our invention is extremely simple in construction, and provides a cover or umbrella that can be easily attached to a horse, and that when not in use the same can be so closed as to occupy but a minimum amount of space, and that the same is easily opened and caused to assume the desired position in conforming to the outline of the horse's back.

We claim as our invention—

1. In a support for a horse-cover, a back-arch and a series of bows or plates having lazy-tong connections, the whole being capable of attachment directly to the horse's back, as shown and described.

2. In supports for horse covers or umbrellas, the herein-described series of bows or curved plates and the lazy-tong connections therefor, said bows or plates conforming to the general outline of the horse's back, as shown and described.

3. In supports for horse-covers, the combination of the back arch or plate having the pads secured thereto, the connecting straps or bands, the series of bows or plates, and the lazy-tong connections, all constructed and arranged substantially as shown and described.

4. The combination, with the back arch or plate, the pads secured thereto, and the belly-band, of the series of bows or plates, the lazy-tong connections, and the corresponding plates by which said bows or plates are connected to said back-arch, substantially as shown and described.

5. The combination, with the back-arch, of the series of bows or plates and the lazy-tong connections, comprising the cross-bars, the normally horizontal connecting-arm, and the lever-arm having a flanged end, substantially as shown and described.

6. The combination, with the back arch or plate, of the U-shaped plates or brackets, the connecting-pins, the plates having upper curved ends, the series of bows or plates, and the lazy-tong connections secured to said plates, substantially as shown and described.

In testimony whereof we affix our signatures in presence of two witnesses.

THOMAS A. LONG.
SAMUEL P. FILLEY.
FREDRICK N. RUGGLES.

Witnesses:
 WM. C. PRICE,
 ASHER MINER.